(12) United States Patent
Jernigan, IV et al.

(10) Patent No.: US 9,336,255 B2
(45) Date of Patent: May 10, 2016

(54) TECHNIQUES FOR TRAVERSAL AND STORAGE OF DIRECTORY ENTRIES OF A STORAGE VOLUME

(71) Applicant: NETAPP, INC., Sunnyvale, CA (US)

(72) Inventors: Richard Parvin Jernigan, IV, Sewickley, PA (US); Robert Wyckoff Hyer, Jr., Seven Fields, PA (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 14/669,400

(22) Filed: Mar. 26, 2015

(65) Prior Publication Data

US 2015/0199354 A1 Jul. 16, 2015

Related U.S. Application Data

(63) Continuation of application No. 13/682,597, filed on Nov. 20, 2012, now Pat. No. 9,009,206.

(51) Int. Cl.
*G06F 17/30* (2006.01)
*G06F 3/06* (2006.01)

(52) U.S. Cl.
CPC .............. *G06F 17/3033* (2013.01); *G06F 3/06* (2013.01); *G06F 17/30097* (2013.01)

(58) Field of Classification Search
CPC .................................................... G06F 17/3033
See application file for complete search history.

(56) References Cited

U.S. PATENT DOCUMENTS

| | | | |
|---|---|---|---|
| 6,915,307 B1 * | 7/2005 | Mattis et al. | |
| 6,961,739 B2 * | 11/2005 | Lee et al. | 707/830 |
| 2006/0218176 A1 * | 9/2006 | Sun Hsu et al. | 707/102 |
| 2010/0293338 A1 * | 11/2010 | Krishnaprasad et al. | 711/136 |

* cited by examiner

*Primary Examiner* — James E Richardson
(74) *Attorney, Agent, or Firm* — Gilliam IP PLLC

(57) ABSTRACT

Techniques for adding a directory entry to an existing directory data structure maintained by a storage system for storing a plurality of directory entries are provided. A first storage index block is used for storing a pointer to a first hash value from among a plurality of hash values. A second storage index block is allocated when the first storage index block has reached a threshold level for storing pointers to hash values for the plurality of directory entries. A group of pointers including a pointer to a second hash value from among the plurality of hash values is selected. The group of pointers is stored in the second storage index block with a pointer to a third hash value from among the plurality of hash values such that the directory entry can be searched using the plurality of hash values.

17 Claims, 14 Drawing Sheets

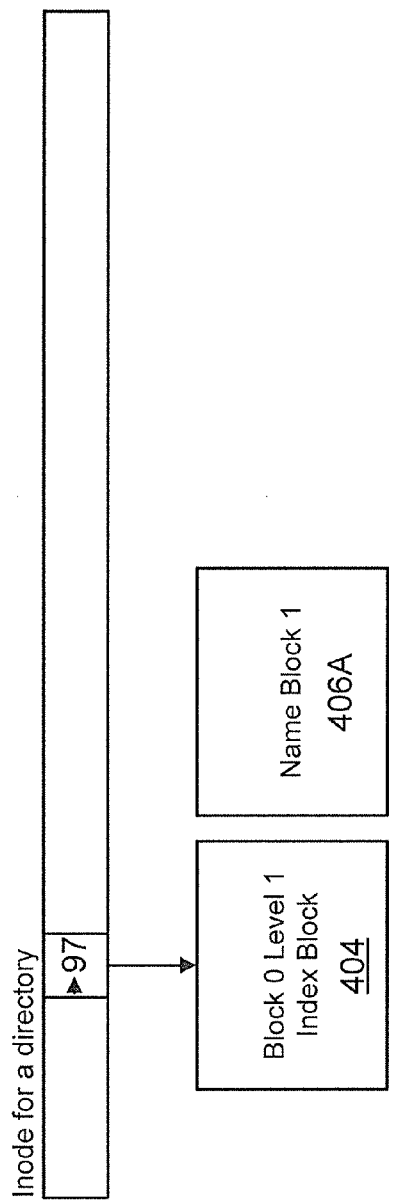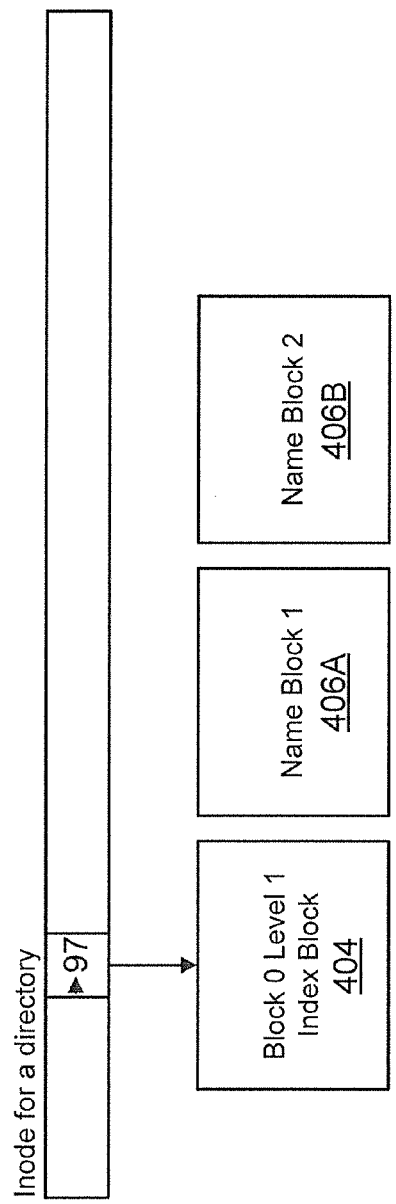
FIG. 4B
FIG. 4C

TECHNIQUES FOR TRAVERSAL AND STORAGE OF DIRECTORY ENTRIES OF A STORAGE VOLUME

CROSS-REFERENCE TO RELATED APPLICATIONS

This application is a continuation of co-pending application Ser. No. 13/682,597, filed on Nov. 20, 2012, the disclosure of which is incorporated herein by reference in its entirety.

TECHNICAL FIELD

The present disclosure relates to storage systems and more particularly, for allocating and managing storage space for storing directory entries.

BACKGROUND

A storage system typically comprises one or more storage devices where information may be entered, and from which information may be obtained, as desired. The storage system typically includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a storage device directly attached to a user or host computer. Storage of information is preferably implemented as one or more storage "volumes" of physical storage devices, defining an overall logical arrangement of storage space.

Storage systems often have to store millions of directory entries to implement a hierarchical organization of data stored with the volumes. It is desirable to manage the directory entries in a manner such that the directory entries can be searched quickly when accessing underlying data blocks and the storage of such directory entries may be optimized within the storage space. Continuous efforts are being made to enhance the management of directory entries to optimize the processing and storage of volume metadata such as directory entries.

SUMMARY

In one embodiment, a machine implemented method and system for adding a new directory entry to an existing directory data structure maintained by a storage system for storing a plurality of directory entries are provided. A plurality of hash values based on the new directory entry is generated. A first level storage block is used for storing a pointer to a first hash value from among the plurality of hash values. A new third level storage block is allocated when a second level storage block has reached a threshold level for storing pointers to hash values for the plurality of directory entries.

A group of pointers including a pointer to a second hash value from among the plurality of hash values is selected. The group of pointers is stored in the third level storage block with a pointer to a third hash value from among the plurality of hash values such that the new directory entry can be searched using the plurality of hash values. In another embodiment, instead of allocating the new third level storage block, an existing third level storage block is searched and then re-used for storing the group of pointers.

In another embodiment, a machine implemented method for processing a new directory entry of an existing directory data structure maintained by a storage system is provided. The method includes generating a plurality of hash values based on the new directory entry, wherein the new directory entry can be searched using the plurality of hash values; storing an initial pointer to a first hash value from the plurality of hash values at a first storage block; storing a pointer to a second hash value from the plurality of hash values at a second storage block; reaching a threshold level for storing pointers at the second storage block; and storing a group of pointers including a pointer to a third hash value from the plurality of hash values at a third storage block.

In yet another embodiment, a machine implemented method for processing a new directory entry of an existing directory data structure maintained by a storage system is provided. The method includes using a first level storage block for storing a pointer to a first hash value from among a plurality of hash values that are based on a name for the new directory entry; searching for an existing third level storage block when a second level storage block has reached a threshold level for storing pointers to hash values for the plurality of directory entries; selecting a group of pointers including a pointer to a second hash value from among the plurality of hash values; and storing the group of pointers in the third level storage block with a pointer to a third hash value from among the plurality of hash values such that the new directory entry can be searched using the plurality of hash values.

In yet another embodiment a system having a storage system configured to maintain an existing directory data structure for storing a plurality of directory entries corresponding to information stored at a storage device managed by the storage system is provided. To add a new directory entry, the storage system is configured to generate a plurality of hash values based on the new directory entry; use a first level storage block at the storage device to store a pointer to a first hash value from among the plurality of hash values; allocate a new third level storage block at the storage device when a second level storage block has reached a threshold level for storing pointers to hash values for the plurality of directory entries; select a group of pointers including a pointer to a second hash value from among the plurality of hash values; and store the group of pointers in the third level storage block with a pointer to a third hash value from among the plurality of hash values such that the new directory entry can be searched using the plurality of hash values.

In another embodiment a system having a storage system configured to maintain an existing directory data structure for storing a plurality of directory entries corresponding to information managed by the storage system is provided. To add a new directory entry, the storage system is configured to generate a plurality of hash values based on the new directory entry; use a first level storage block for storing a pointer to a first hash value from among a plurality of hash values that are based on a name for the new directory entry; search for an existing third level storage block when a second level storage block has reached a threshold level for storing pointers to hash values for the plurality of directory entries; select a group of pointers including a pointer to a second hash value from among the plurality of hash values; and store the group of pointers in the third level storage block with a pointer to a third hash value from among the plurality of hash values such that the new directory entry can be searched using the plurality of hash values. The existing third level block is selected based on a number of pointers from one or more second level storage blocks that reference the existing third level block.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures:

FIGS. 4B-4E show the use of index and name blocks for storing directory entries;

DETAILED DESCRIPTION

As a preliminary note, the terms "component", "module", "system," and the like as used in this disclosure are intended to refer to a computer-related entity, either programmable instructions-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, flash memory device or any other non-volatile memory device, or any other storage device, in accordance with the claimed subject matter.

In one embodiment, a machine implemented method and system for adding a directory entry to an existing directory data structure maintained by a storage system for storing a plurality of directory entries are provided. A plurality of hash values based on the directory entry is generated. A first level storage block is used for storing a pointer to a first hash value from among the plurality of hash values. A new third level storage block is allocated when a second level storage block has reached a threshold level for storing pointers to hash values for the plurality of directory entries. A group of pointers including a pointer to a second hash value from among the plurality of hash values is selected. The group of pointers is stored in the third level storage block with a pointer to a third hash value from among the plurality of hash values such that the directory entry can be searched using the plurality of hash values. In another embodiment, instead of allocating the new third level storage block, an existing third level storage block is searched and then re-used for storing the group of pointers.

Figure 1:
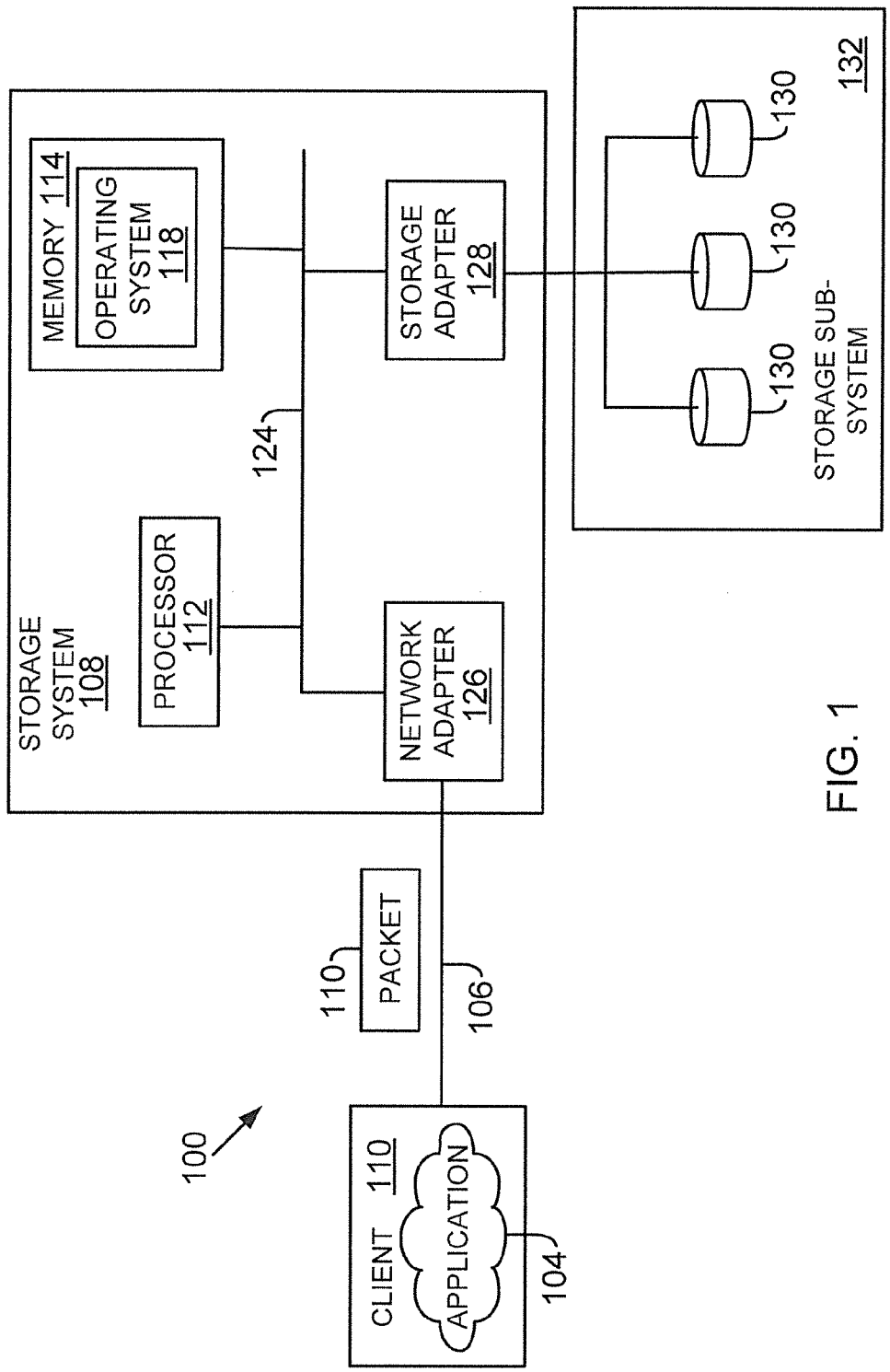
FIG. 1 shows a block diagram of a system using the embodiments disclosed herein.

System 100:

FIG. 1 is a schematic block diagram of an operating environment 100 (may also be referred to as system 100) having a storage system 108 that may be advantageously used with the present disclosure. Storage system 108 is used to store one or more data containers, for example, directories, files, structured and unstructured data.

The storage system 108 may be one or more computing system that provides storage services relating to organization of information at mass storage devices, such as storage devices 130 of a storage sub-system 132. Storage devices 130 may be, for example, tape drives, conventional magnetic disks, optical disks such as CD-ROM or DVD based storage, magneto-optical (MO) storage, flash memory storage device or any other type of storage device suitable for storing structured and unstructured data. Some of the examples disclosed herein may reference a storage device as a "disk" or a "disk drive" but the adaptive embodiments disclosed herein are not limited to any particular type of storage media/device.

The storage system 108 comprises one or more processor 112 (also referred to as a central processing unit), a memory 114, a network adapter 126 and a storage adapter 128 interconnected by an interconnect system (also referred to as a "bus system") 124. Processor 112 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices. The bus system 124, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The storage system 108 also includes a storage operating system 118 that preferably implements a high-level module, such as a file system, to logically organize information as a hierarchical structure of data containers on storage devices 130. In the illustrative embodiment, memory 114 comprises storage locations that are addressable by processor 112 and other modules, for example, storage adapter 128 and network adapter 126) for storing machine executable instructions.

Storage operating systems 118, portions of which are typically resident in memory and executed by the processing elements, functionally organizes the system 108 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 includes mechanical, electrical and signaling circuitry needed to connect the storage system 108 to one or more client systems 102 (shown as client 102) over a connection system 106 (also referred to as network 106), which may comprise a point-to-point connection or a shared medium, such as a local area network. Illustratively, connection system 106 may be embodied as an Ethernet network, a Fibre Channel (FC) network or any other network type. The client 102 may communicate with the storage system over network 106 by exchanging discrete frames or packets of data according to pre-defined protocols, such as the Transmission Control Protocol/Internet Protocol (TCP/IP) or any other protocol type.

Client 102 may be a general-purpose computer configured to execute processor executable applications 104. Moreover, client 102 may interact with the storage system 108 in accordance with a client/server model of information delivery. That is, the client may request the services of the storage system, and the system may return the results of the services requested by the client, by exchanging packets 110 over the network 106. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 118 executing on the system 108 to access information requested by a user (or client). The storage adapter includes input/output (I/O) interface circuitry that couples to the storage devices over an I/O interconnect arrangement, such as a conventional high-performance, FC serial link topology.

Storage system 108 presents storage volumes to clients for reading and writing data. The term storage volume or volume as used herein means a logical data set which is an abstraction of physical storage, combining one or more physical mass storage devices or parts thereof into a single logical storage object. However, each storage volume can represent the storage space in one storage device, an aggregate of some or all of the storage space in multiple storage devices, a RAID group, or any other set of storage space.

A storage volume is typically a collection of physical storage devices 130 cooperating to define an overall logical arrangement of volume block number (vbn) space on the volume(s). Each logical volume is generally, although not necessarily, associated with its own file system. The storage devices within a logical volume/file system are typically organized as one or more groups, wherein each group may be operated as a RAID.

To facilitate access to the storage devices 130, in one embodiment, the storage operating system 118 implements a write-anywhere file system. The file system logically organizes information as a hierarchical structure of named data containers, e.g. directories and files. Each "on-disk" data container may be implemented as set of blocks configured to store information, such as data, whereas the directory may be implemented as a specially formatted data container in which names and links to other data containers and directories are stored.

In the illustrative embodiment, the storage operating system is preferably the NetApp® Data ONTAP™ operating system available from NetApp, Inc., Sunnyvale, Calif. that implements a Write Anywhere File Layout (WAFL™) file system (without derogation of any trademark rights of NetApp Inc. in NetApp®, ONTAP™, WAFL™ and other terms used herein). However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this disclosure.

Although storage system 108 is shown as a stand-alone system, i.e. a non-cluster based system, in another embodiment, storage system 108 may have a distributed architecture that may include, for example, a separate N-("network") blade and D-(disk) blade. Briefly, the N-blade is used to communicate with client 102, while the D-blade is used to communicate with the storage devices 130 that are a part of a storage sub-system. The N-blade and D-blade may communicate with each other using an internal protocol. The term blade as used herein means a computing system, a processor based system or any other similar system.

Alternatively, storage system 108 may have an integrated architecture, where the network and data components are all contained in a single box. The storage system 108 further may be coupled through a switching fabric to other similar storage systems (not shown) which have their own local storage subsystems. In this way, all of the storage subsystems can form a single storage pool, to which any client of any of the storage servers has access.

Figure 2:
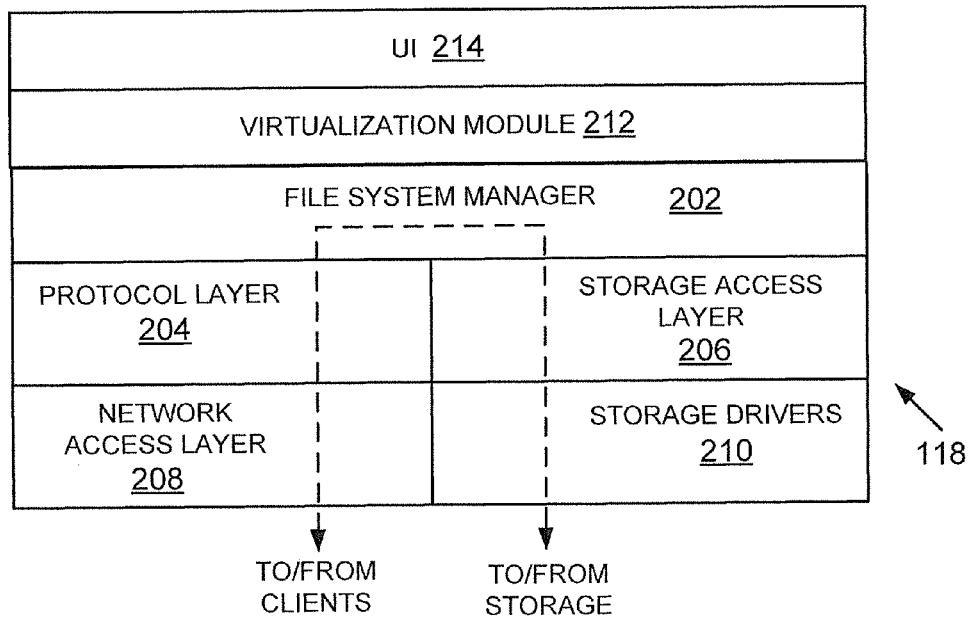
FIG. 2 shows an example of a storage operating system, used according to one embodiment.

Storage Operating System 118:

FIG. 2 illustrates a generic example of a storage operating system 118, according to one embodiment of the present disclosure. The storage operating system 118 manages a plurality of data containers and storage space at storage devices 130. In one example, operating system 118 may include several modules, or "layers". These layers include a file system manager 202 that keeps track of a directory structure (hierarchy) of the data stored in storage devices and manages read/write operations, i.e., executes read/write operations on storage devices 130.

The file system manager 202 also maintains a directory look up index tree that is described below in detail. The loop up index tree may be used to search directory names while efficiently using storage space for storing the index tree.

Operating system 118 may also include a protocol layer 204 and an associated network access layer 208, to allow storage system 108 to communicate over a network with other systems, for example, client 102 or other storage systems. Protocol layer 204 may implement one or more of various higher-level network protocols, such as Hypertext Transfer Protocol (HTTP), TCP/IP and others.

Network access layer 208 may include one or more drivers, which implement one or more lower-level protocols to communicate over the network, such as Ethernet. Interactions between client 102 and mass storage devices 130 are illustrated schematically as a path, which illustrates the flow of data through operating system 118.

The operating system 118 may also include a storage access layer 206 and an associated storage driver layer 210 to communicate with storage devices 130. The storage access layer 206 may implement a higher-level storage protocol, such as RAID, while the storage driver layer 210 may implement a lower-level storage device access protocol, such as SCSI.

File system manager 202 may include or interface with the various components of system 100 that have been described above in detail with respect to FIG. 1. File system 202 interfaces with or includes a virtualization module 212 to enable access via a user interface (UI) 214, to a user (system administrator) issuing commands to the storage system 108. UI 214 is disposed over the storage operating system in a manner that enables administrative or user access to the various layers and systems.

It should be noted that the software "path" through the operating system layers described above may alternatively be implemented in hardware or a combination of hardware and software. That is, in an alternate embodiment of the disclosure, the storage access request data path may be implemented as logic circuitry embodied within a field programmable gate array (FPGA) or an ASIC.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems.

In one embodiment, the file system 202 illustratively implements the WAFL file system having an on-disk format representation that is block-based using, e.g., 4 kilobyte (kB) blocks and using index nodes ("modes") to identify data containers and data container attributes (such as creation time, access permissions, size and block location). The file system 202 uses data containers (metadata files) to store metadata describing the layout of its file system. These metadata files include, among others, an mode having a file handle, an identifier that includes an mode number used to retrieve the mode from a storage location.

Broadly stated, all modes of the write-anywhere file system are organized into the mode data container. A file system (FS) information block specifies the layout of information in the file system and includes an mode of a data container that includes all other modes of the file system. Each logical volume (file system) has an FS information block that is preferably stored at a fixed location within, e.g., a RAID group. The mode of the root FS information block may directly reference (point to) blocks of the mode file or may reference indirect blocks of the mode file that, in turn, reference direct blocks of the mode file. Within each direct block of the mode file are embedded modes, each of which may reference indirect blocks that, in turn, reference data blocks of a data container.

Operationally, a request from the client 102 is forwarded as a packet 110 over the computer network 106 and onto the storage system 108 where it is received at the network adapter 126. A network driver (of layer 208) processes the packet and, if appropriate, passes it on to a network protocol and file access layer for additional processing prior to forwarding to the write-anywhere file system 202. Here, the file system generates operations to load (retrieve) the requested data from storage device 130 if it is not resident "in core", i.e., in a memory cache (not shown).

If the information is not in the cache, the file system 202 indexes into the mode data container using the mode number to access an appropriate entry and retrieve a logical vbn. The file system 202 then passes a message structure including the logical vbn to storage access layer 206. The logical vbn is mapped to a storage device identifier and a disk block number (disk, dbn) and sent to the storage driver 210. The storage driver 210 accesses the dbn from the specified disk 130 and loads the requested data block(s) for processing by the storage system. Upon completion of the request, the storage system (and operating system) returns a reply to the client 102 over the network 106.

Figure 3:
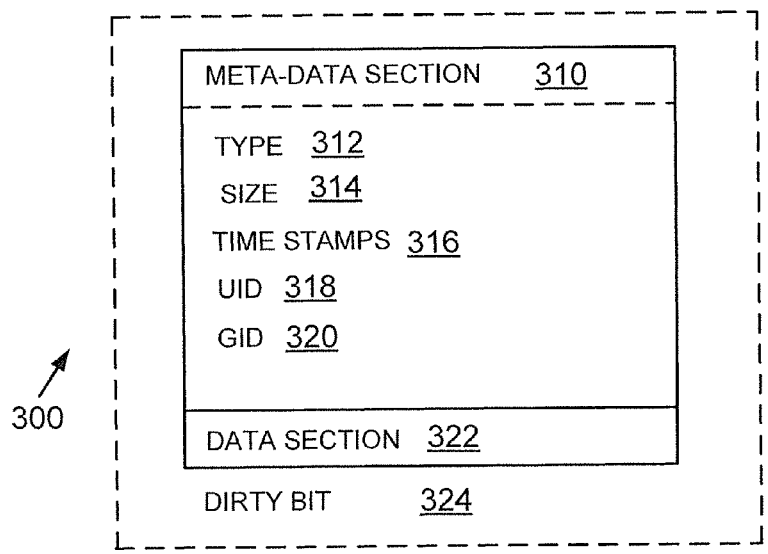
FIG. 3 shows an example of storing metadata for a data container.

Inode 300:

In the illustrative embodiment, a data container is represented as an mode adapted for storage at storage device 130. FIG. 3 provides an example of an mode 300, which preferably includes a metadata section 310 and a data section 320. The information stored in the metadata section 310 of each mode 300 describes the data container and, as such, includes the type (e.g., regular, directory, virtual disk) 312 of data container, the size 314 of the data container, time stamps (e.g., access and/or modification) 316 for the data container and ownership, i.e., user identifier (UID 318) and group identifier (GID 320).

The contents of the data section 320 of each mode, however, may be interpreted differently depending upon the type of mode defined within the type field 312. For example, the data section 320 of a directory mode contains metadata controlled by the file system 202, whereas the data section of a regular mode contains file system data. In this latter case, the data section 320 includes a representation of the data associated with the data container.

Specifically, the data section 320 of a regular mode may include file system data or pointers, the latter referencing 4 kB data blocks to the storage device 130 used to store the file system data. Each pointer is preferably a logical vbn to facilitate efficiency among the file system 202 when accessing stored data.

When an on-disk mode (or block) is loaded from storage device 130 into memory 114, its corresponding in core structure embeds the on-disk structure. For example, the dotted line surrounding the mode 300 (FIG. 3) indicates the in core representation of the on-disk mode structure. The in core structure is a block of memory that stores the on-disk structure plus additional information needed to manage data in the memory (but not on disk). The additional information may include, e.g., a "dirty" bit 322. After data in the mode (or block) is updated/modified as instructed by, e.g., a write operation, the modified data is marked "dirty" using the dirty bit 322 so that the mode (block) can be subsequently "flushed" (stored).

Figure 4A:
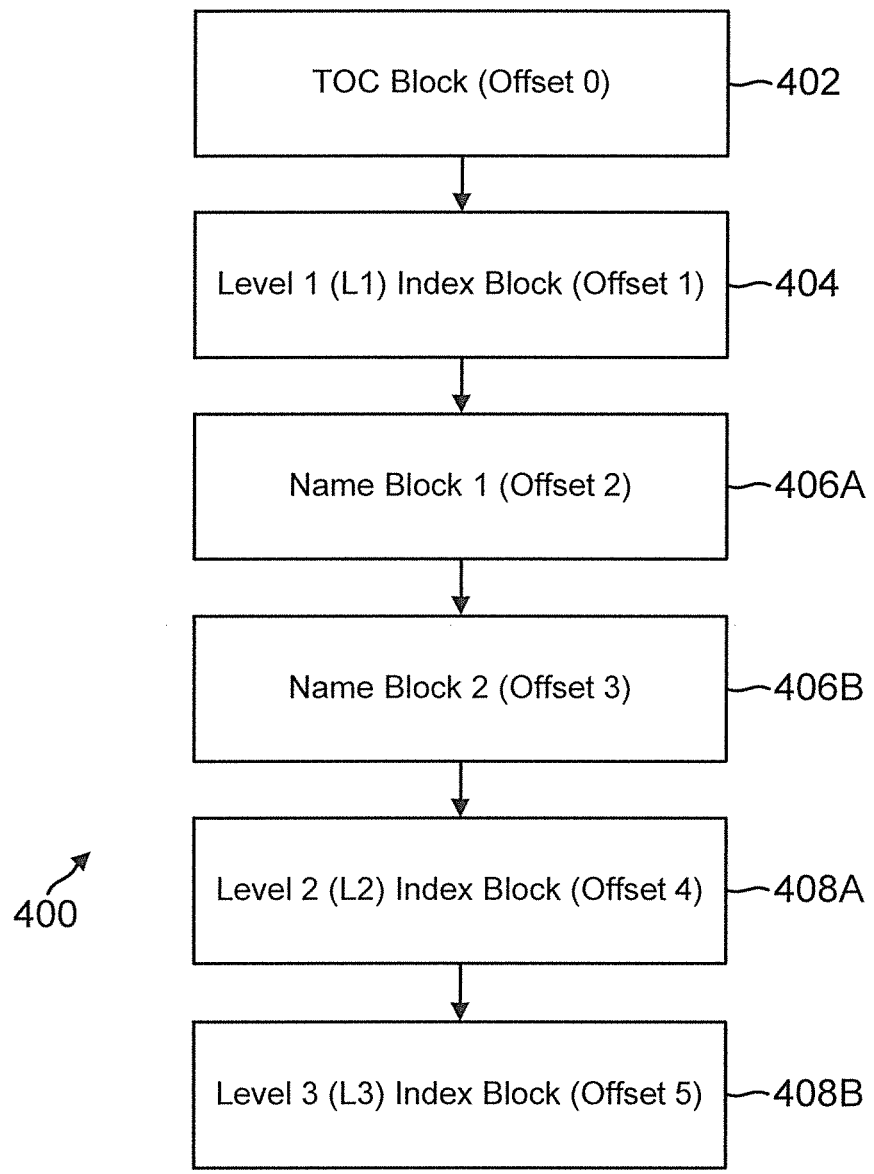
FIG. 4A shows a format for storing directory entries, according to one embodiment.

Directory Format 400:

File system manager 202 typically maintains a directory with a look up index tree stored at storage devices 130. A directory format 400 used by the file system manager 202 is shown in FIG. 4A.

Briefly, directory format 400 uses blocks (for example, 4 KB size blocks) to store directory names/information at storage devices 130. Each block is identified either as table of content (TOC) block 402, a first level (L1) index block 404, name blocks 406A/406B (may be referred to as name block 406 or name blocks 406), a level two (L2) index block 408A, or a level three (L3) index block 408B that are described below in detail.

TOC block 402 is relatively rare and may be used to identify and manage a pattern of index blocks 404/408A/408B. TOC block 402 is a bitmap descriptor block used to identify how other blocks in a directory data container are being used. As an example, TOC block 402 describes the use of a plurality of blocks in the directory data container, for example, using 2 bits per block to identify if a block is an index block, name block or a free block. TOC block 402 is located at pre-defined offsets (for example, 0, 16k, 32k and others) and is allocated on an as-needed basis.

The block 404 is a L1 index block that is allocated after a first name block 406A becomes full and a second name block 406B is allocated. The L1 index block 404 is the top-level block of a radix tree that is described below in more detail. As file names continue to be added, the L1 index block 404 is not big enough to store all the indexing information and lower level index blocks (i.e. L2 and L3) 408A/408B are added. The index blocks 404 and 408 can be used to lookup directory entries as described below in more detail.

The name blocks 406 are used to store variable length directory names. The name blocks 406 may use a slotted page format for storing file names. The format uses an array of memory slots in the block for storing names. A particular file name is referred to by its block offset within the directory and by a slot number within the block. To insert a directory entry involves either appending a new fixed size slot at the beginning of a block or by reclaiming an existing but previously freed slots. Details regarding adding new entries, according to the present disclosure are provided below.

FIG. 4B shows an example of using directory format 400. An mode directory file numbered 97 is used to store directory names. When a first entry is added for directory 97, name block 406A is allocated at offset 1. The L1 index block 404 at this stage remains unallocated because the first directory entry can be easily saved within the name block 406A.

Figure 4D:
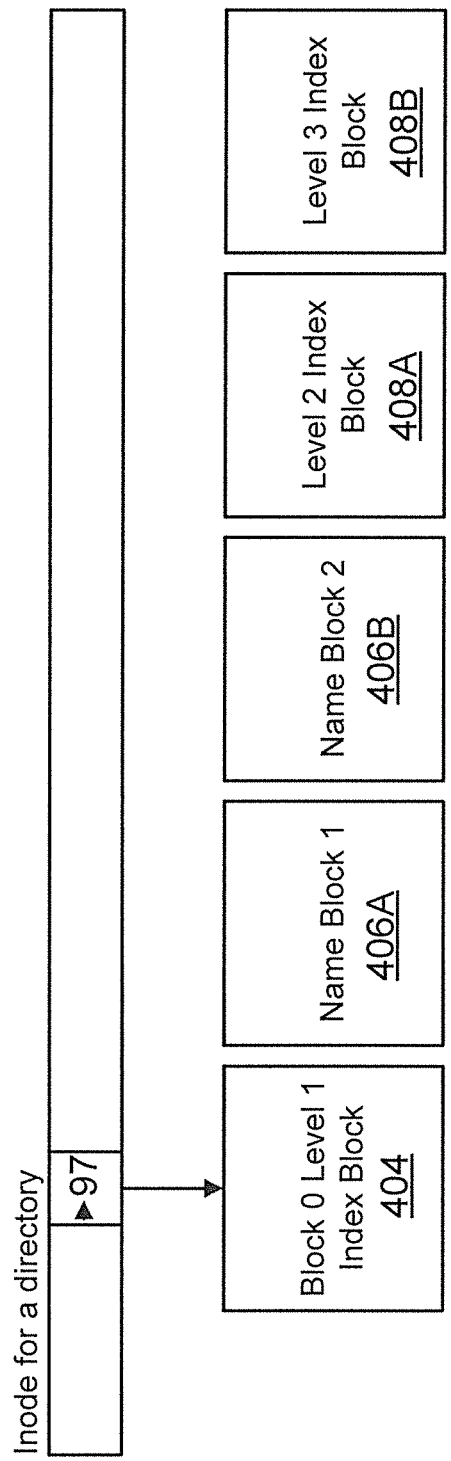

As the directory 97 continues to grow, more names may be added. When more names are added to mode 97, then a second name block 406B may be allocated as shown in FIG. 4C. The L1 index block 404 is then allocated and used as an index block to look up file names, as described below in detail. As more file names are added, the L1 index block 404 may become full because it may only be able store a certain number of pointers (for example, 1024 pointers) or a pointer in the L1 index block 404 may point to a hash chain that includes too many entries (for example, 6 hash chain entries may be considered to be too "long") as described below in more detail. To accommodate more directory entries, lower level index blocks are allocated as shown in FIG. 4D. Once the L2 index block 408A becomes full, a L3 index block 408B is allocated. The term "full" as used herein means when a hash chain has become too "long" or when the block has reached a threshold value for storing certain number of pointers. The use of hash values/chains is described below in detail.

Figure 4E:
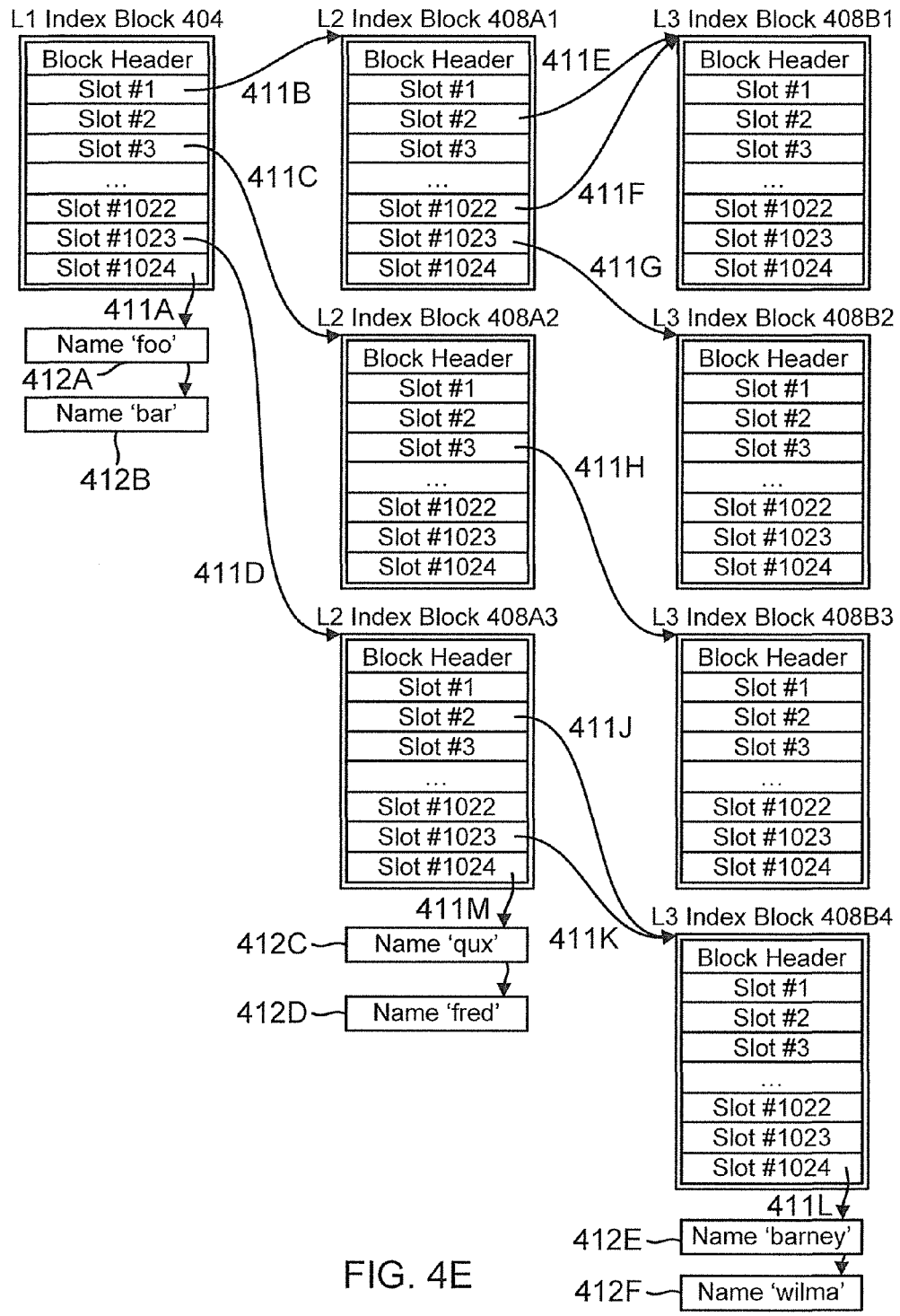

The various index blocks operate as a look up tree that can be used to look up (or search for) directory entries. FIG. 4E provides an example of an indexed look up tree 410, used according to one embodiment of the present disclosure. The look up tree 410 includes the L1 index block 404, various L2 index blocks 408A (shown as 408A1-408A3) and L3 index blocks 408B (shown as 408B1-408B2).

To add a file name for directory 97, file system 202 generates a plurality of hash values based on the file name. For example, the file name may be used to generate three hash values H1, H2 and H3 that may each be 10 bits in size. The hash values may be generated using well known hashing techniques, for example, the Fowler/Noll/Vo hashing technique. Details of how the hash values are generated from a file name are not germane to the embodiments disclosed herein.

The hash values are used to build a look up index that is stored at storage devices 130 as the look up index tree (may also be referred to as a three-tier radix tree) 410. For example, the first 10 bits (H1) may be used as a key for a first level of indexing; the next 10 bits (H2) may be used for second level of indexing and so forth. This provides separate indexing values from a file name hash.

The look up index tree 410 can be used efficiently to search for directory entries by using the hash values. When directory entries are searched, only the index blocks that store the hash values (or hash chains) are loaded into memory 114, compared to loading an extensive directory that may have millions of names.

The L1 index block 404 may be used to store a first level hash chain for directory entries. As shown in FIG. 4E, L1 index block 404 includes a plurality of slots, shown as slot#1-slot#1024. The various slots are used to store pointers to file names or to L1 index blocks. For example, L1 index block stores pointer 411A for directory entries labeled as "foo" 412A and "bar" 412B.

As a hash chain grows in L1 index blocks, for example, if a hash chain has more than 6 entries, then a L2 index block is allocated and the hash chain is moved to the L2 index block. A pointer at L1 index block then refers to the L2 index block. For example, pointer 411B points to L2 index block 408A1, pointer 411C points to L2 index block 408A2 and pointer 411D points to L2 index block 408A3.

The L2 index block 408A also stores pointers to name blocks 406. For example, L2 index block 408A3 stores pointers 411M to directory entries 412C and 412D, labeled as "qux" and "fred", respectively.

As more names are added, the hash chain at the L2 index block 408A becomes unwieldy. To accommodate longer hash chains, an L3 index block is allocated and the long hash chain from the L2 index block is pushed to the L3 index block 408B.

The L3 index block 408B also stores pointers, for example, pointer 411L to directory entry 412E, labeled as "barney" and "Wilma" labeled as 412F. Once the hash chains at the L3 index block 408B become too long, other L3 index blocks are allocated. In conventional systems, the use of L3 index blocks may not be very efficient because an L3 index block is associated with only a single pointer stored at one of the slots of a L2 index block. This approach has disadvantages, as described below.

Assume that L2 index block 408A1 can store a maximum of 1024 pointers and there are 1024 L2 index blocks. Thus one can theoretically use 1048576 L3 index blocks 408B (i.e. 4 GB storage space). The first million file names may be stored efficiently using the 4 GB space, but after that there is a rapid increase in the number of L3 index blocks such that the number of L3 index blocks are far greater than the number of name blocks 406 for a directory such that the bulk of storage is used for the index blocks vis-à-vis the name blocks. The challenges faced by conventional systems are illustrated in FIGS. 4F-4H and described below.

Figure 4F:
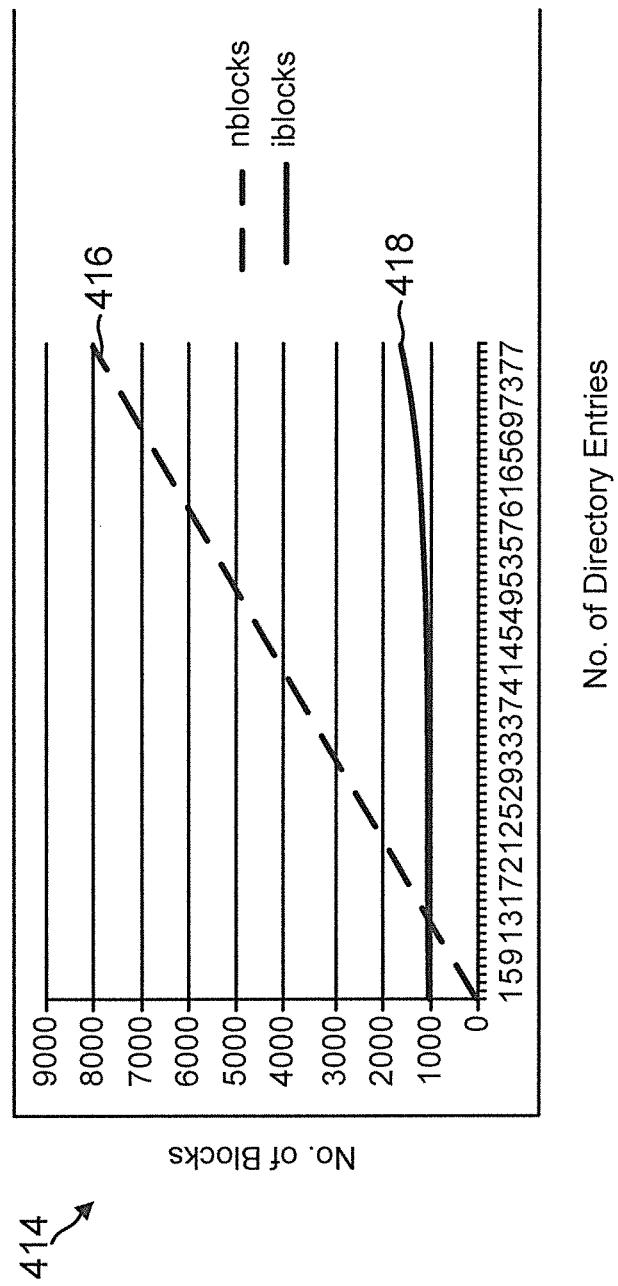
FIGS. 4F-4H graphically illustrate the shortcomings of conventional systems using storage space for storing directory entries.

FIG. 4F provides a graphical illustration 414 that shows the number of index and name blocks (i.e. the number of blocks) on the y-axis and the number of directory entries shown on the x-axis. The number of directory entries in this example is less than a million. The number of name blocks is shown by the line 416, while the number of index blocks is shown by line 418. By evaluating lines 416 and 418, one can infer that the number of index blocks is relatively smaller than the number of name blocks for storing about a million directory entries. The data for the graph 414 was experimentally collected by the assignee, NetApp Inc.

Figure 4G:
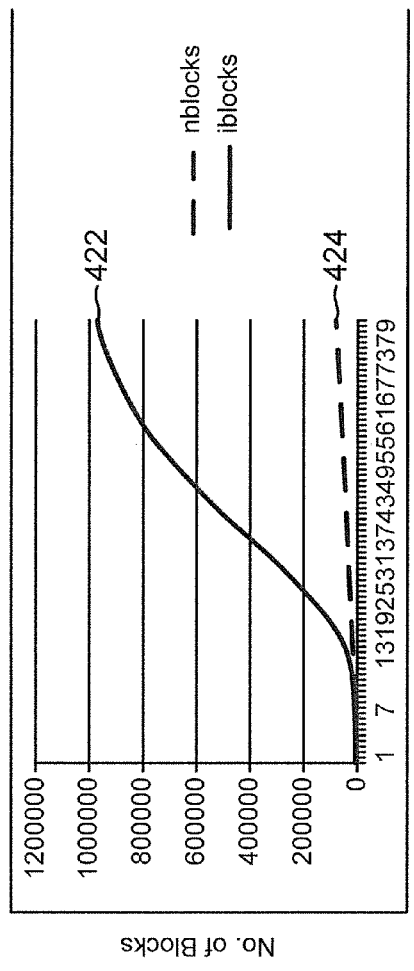
Figure 4H:
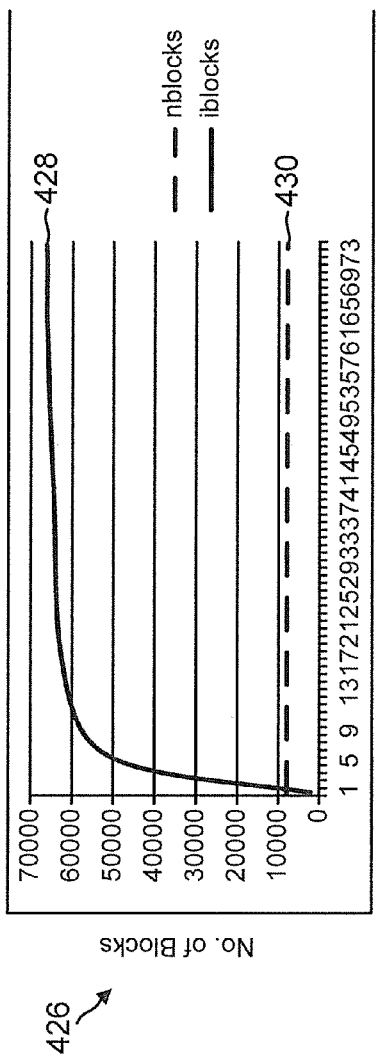

FIG. 4G shows another graph 420 that highlights the inefficiency in using storage space without the current embodiments, when the number of directory entries increase to, for example, 10 million names. The number of directory entries is again shown on the x-axis, while the number of blocks is shown on the y-axis. The number of index blocks is represented by curve 422, while the curve 424 represents the number of name blocks for storing directory entries that are greater than a million.

As one can see, the number of index blocks in graph 420 far exceeds the number of name blocks. Instead of the name blocks, the index blocks consume the majority of the storage space for storing the directory entries, which is inefficient use of storage space. The data for graph 420 was also experimentally collected by the assignee of the present invention, NetApp Inc. Random filenames were added to a directory to observe the overall usage of index blocks and name blocks.

FIG. 4H shows yet another graph 426, where the assignee, NetApp Inc. analyzed aging of directory names over 72 hours at about 1000 operations per second. Curve 428 shows the number of index blocks and curve 430 shows the number of name blocks. As shown in graph 426, after a few hours of random activity, the number of index blocks increases more than the number of name blocks and hence storage space usage is far from desirable.

Referring back to FIG. 4E, in one embodiment, instead of a dedicated L3 index block associated with only a single slot of an L2 index block, multiple slots (or pointers) of an L2 index block point to (or reference) a L3 index block. For example, both slot#2 and slot#1022 of L2 index block 408A1 point to L3 index block 408B1 using pointers 411E and 411F. Slot#2 and slot#1023 of L2 index block 408A3 point to L3 index block 408B4 using pointers 411J and 411K. Slot#1023 points to L3 index block 408B2 using pointer 411J. Slot#3 of L2 index block 408A2 points to L3 index block 408B3 using pointer 411H.

The embodiments disclosed herein and described below, provide methods for managing the growth of L3 blocks such that storage space for storing index blocks is used efficiently.

Figure 5:
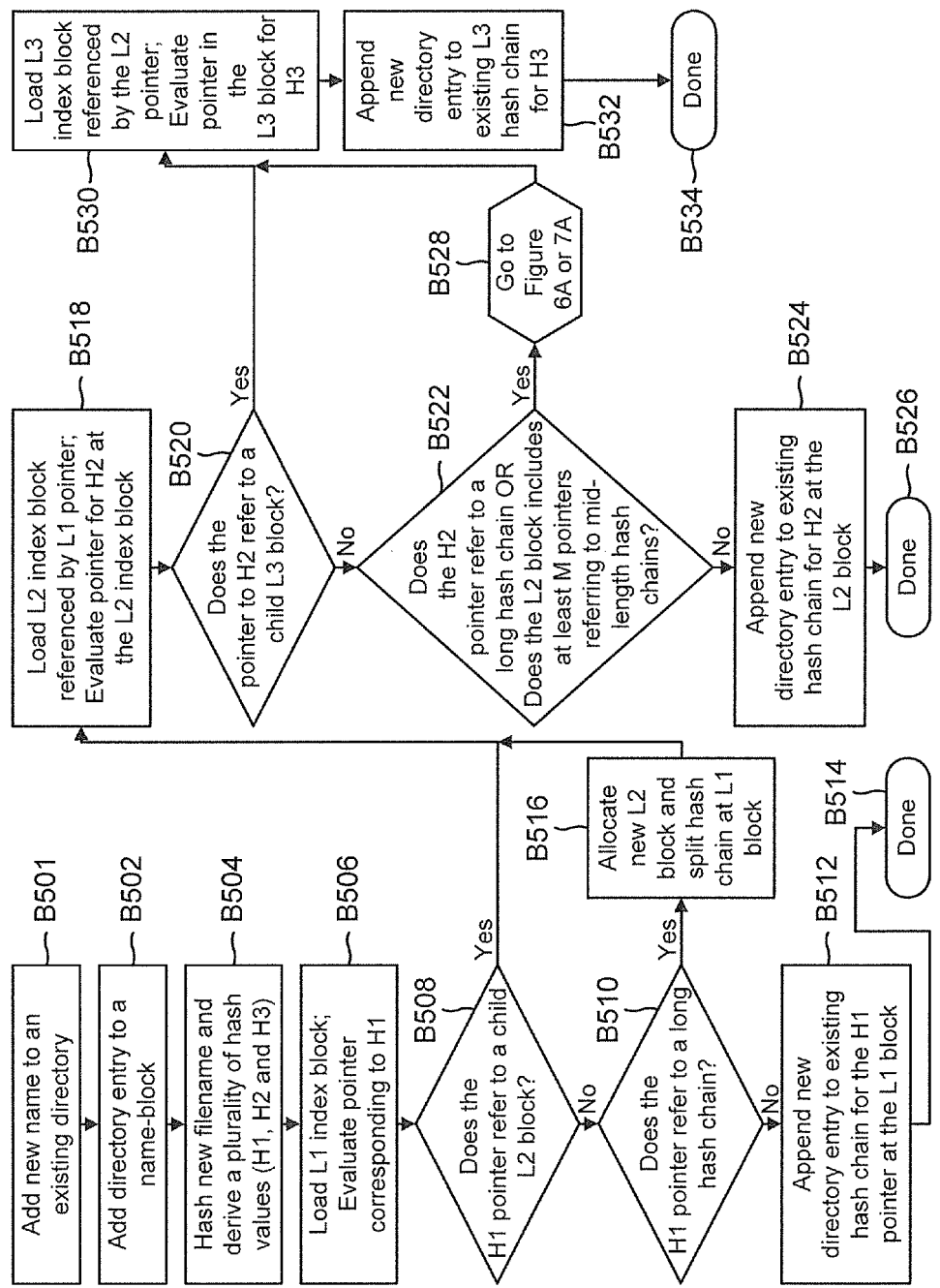
FIGS. 5, 6A-6C and 7A-7B show process flow diagrams for allocating storage space for storing directory entries and a look up index for searching directory entries.

Process Flow:

FIG. 5 shows an overall process flow diagram 500 for adding entries to an existing directory, according to one embodiment. The process begins in block 5501 when a request to add a new name to an existing directory is received by storage operating system 118. The request may be received by the file system manager 202 via UI 214 from another application. In block 502 the directory name is added to a suitable name block, for example, 406A (FIG. 4D) or 412A (FIG. 4E).

In block 504, the file system manager 202 derives a plurality of hash values based on the file name. The hash values may be referred to as H1, H2 and H3. The hash values are used in a look up index tree to search for directory names, as shown in FIG. 4E. As described above, the hash values may be each 10 bits. The embodiments disclosed herein are not limited to the number of bits used for the hash values or the processes used for generating the hash values.

In block B506, a L1 index block is loaded from storage device 130. A pointer to H1 is then evaluated as shown in blocks B508 and B510.

In block B508, the file system manager 202 determines if the H1 pointer refers to a child L2 block (for example, L2 index block 408A1, FIG. 4E). If no child L2 block is referenced by the H1 pointer, then in block B510 the file system manager 202 determines if the H1 pointer refers to a "long" hash chain.

The term "long" hash chain may be programmable and denotes a threshold length (i.e. a number of entries in a hash chain) of a hash chain stored at an index block. When the threshold length is reached, the file system manager 202 concludes that the hash chain is too long. The threshold value may be set by a storage administrator based on a desired trade-off between storage efficiency and lookup performance. For example, if a small value (say 2 hash chain entries) is used to define a "long" chain, then L2 blocks would be created very quickly as a directory increases in size, which represents inefficient use of storage space. Using a large value (say 10 entries) to define a long hash chain implies that the L2 blocks would not be created until the lookup time for a filename has become excessive, representing a performance challenge. Based on access to storage systems, a good comprise has been found to be 5-6 entries.

When the hash chain is not long, then in block B512, a new directory entry is added to the existing L1 index block for H1 and the process ends in block B514.

When the hash chain is too long, then in B516, a new L2 index block is allocated and the hash chain from the L1 index block is split, as shown in FIG. 4E, where the hash chain from the L1 index block is moved (i.e. the pointers from the L1 index block are re-directed) to the L2 index block 408A1 (FIG. 4E). Thereafter, the process moves to block B518. Also, referring back to block B508, if the pointer for H1 refers to a L2 index block, then the process moves to block B518.

In block B518, the L2 index block 408A1 is loaded referenced by a pointer from the L1 block (for example, 411B) and the pointer for the hash value H2 is evaluated as shown in blocks B520 and B522.

In block B520, the file system manager 202 determines if the pointer to H2 refers to a child L3 block 408B (for example, 408B1, FIG. 4E). If the pointer does not refer to a L3 block, then in block B522, the file system manager 202 determines if the H2 pointer refers to a long hash chain or does the L2 index block (408A) include at least M pointers referring to a mid-length hash chain. The number "M" is again programmable and may be set by a storage administrator. If the answer to either of block B522 queries is no, then in block B524, the new directory entry is added to an existing L2 hash chain for H2. The process is then completed in block B526.

If the answer to the queries of block B522 is yes, then the process moves to block B528 that is shown in detail in FIG. 6A or 7A and described below.

After block B528, the process moves to block B530. Also, referring back to block B520, if the pointer to H2 refers to a child L3 block (for example, using 411E), then the process moves to block B530.

In block B530, the L3 index block referenced by the L2 index block pointer is loaded and then the pointer to H3 is evaluated as shown in block 8532. The new entry is then added to the existing L3 hash chain for hash value H3. The process is then completed in block 8534.

Figure 6A:
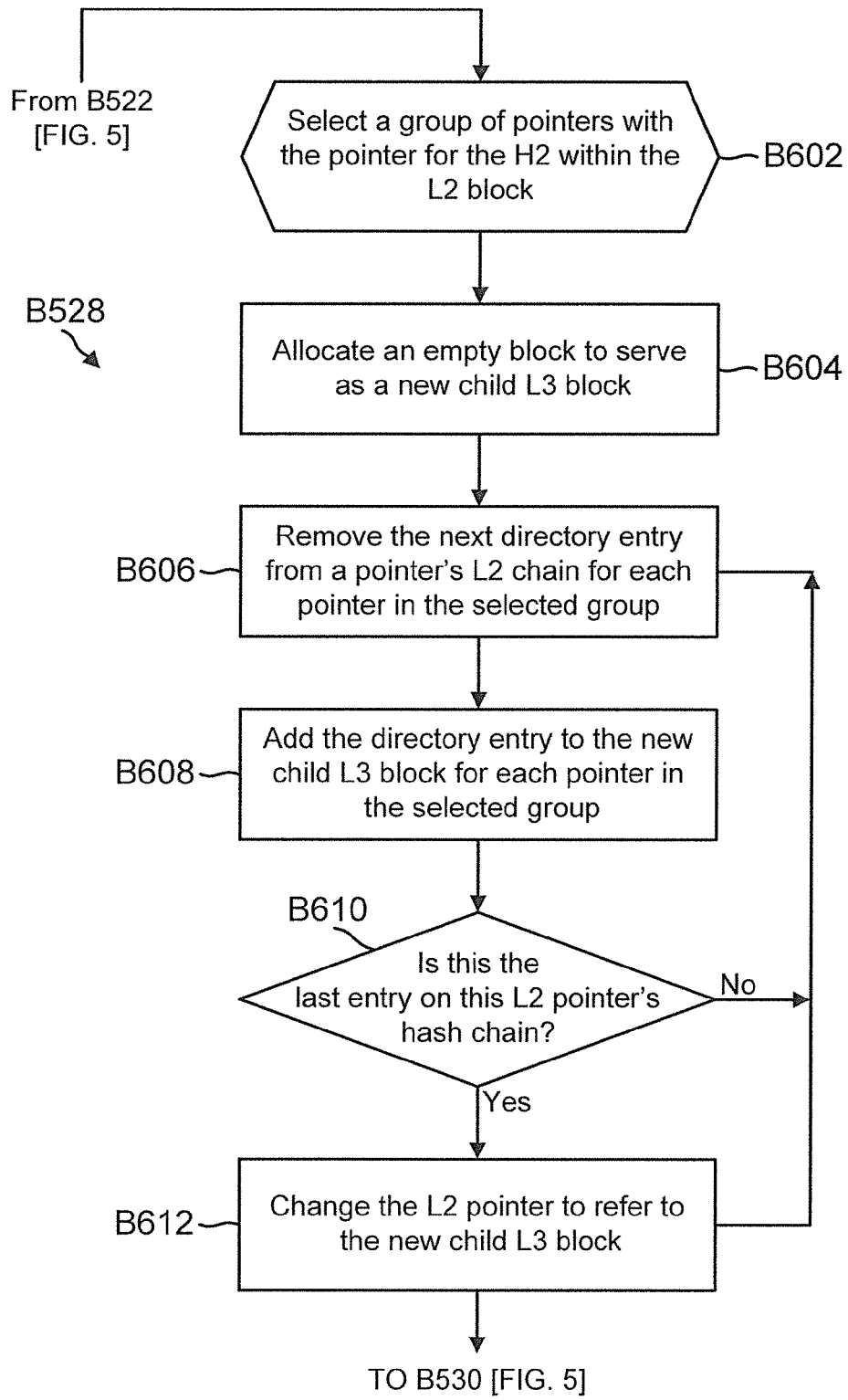

FIG. 6A shows a process flow diagram for block B528, according to one embodiment. The process begins in block B602, when a group of pointers stored at the L2 index block (for example, 408A1, FIG. 4E) are selected by the file system manager 202. The group of pointers includes the pointer for hash value H2. The process for selecting the group of pointers is described below with respect to FIGS. 6B and 6C.

After the group of pointers is selected, in block B604, an empty block is selected to serve as a new L3 index block (for example, 408B1, FIG. 4E). In block B606, the directory entry for each selected pointer from the L2 index block is removed. In block B608, the entries removed from the L2 block are added to the new L3 index block.

In block B610, the process determines if all the entries from the L2 block have been moved to the assigned L3 index block. If not, then the process simply loops back to block B606. If yes, then in block B612, the L2 pointer (for example, 411E, FIG. 4E) is changed to refer to the new child L3 index block. The process then moves to block B530 that has been described above with respect to FIG. 5.

Figure 6B:
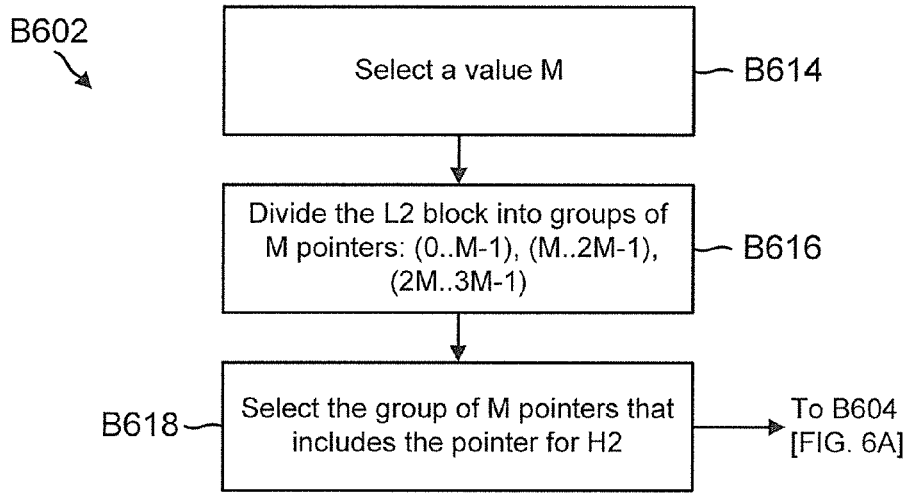

FIG. 6B shows an example of block B602, according to one embodiment. The process begins by selecting a value M in block B614. In one embodiment, the value M may be between 2-128, where a smaller value represents better scalability, while a larger value denotes better space efficiency. In block B616, the various pointers within L2 index block are divided into groups of M pointers, for example, group 1 will have 0 to M−1 pointers, group 2 will have M to 2M−1 pointers, group 3 will have 2M to 3M−1 pointers and so forth. In block B618, the group that has the pointer for the H2 hash value is selected. Thereafter, the process moves to block B604 that has been described above.

Figure 6C:
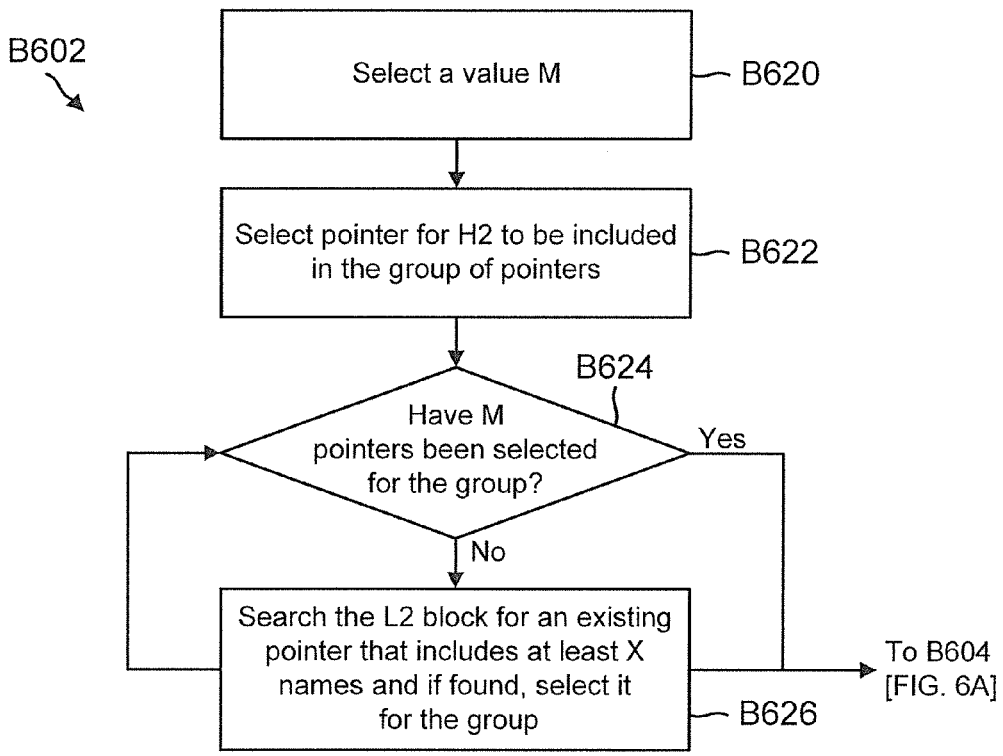

FIG. 6C shows yet another example for implementing block B602. The process starts in block B620 that is similar to block B614 of FIG. 6B. Block B622 is similar to block B618 of FIG. 6B.

In block B624, the file system manager 202 determines if M pointers have been selected for the group. If yes, then the process moves to block B604. If not, then in block B626, the L2 index block is searched for a pointer that points to at least X directory names (for example, two directory names). If the pointer is found, then it is included in the group for the H2 hash chain and the pointer selection process repeats by returning to block B602. If no suitable pointer was found to add to the group, the process moves to block B604 (FIG. 6A).

Figure 7A:
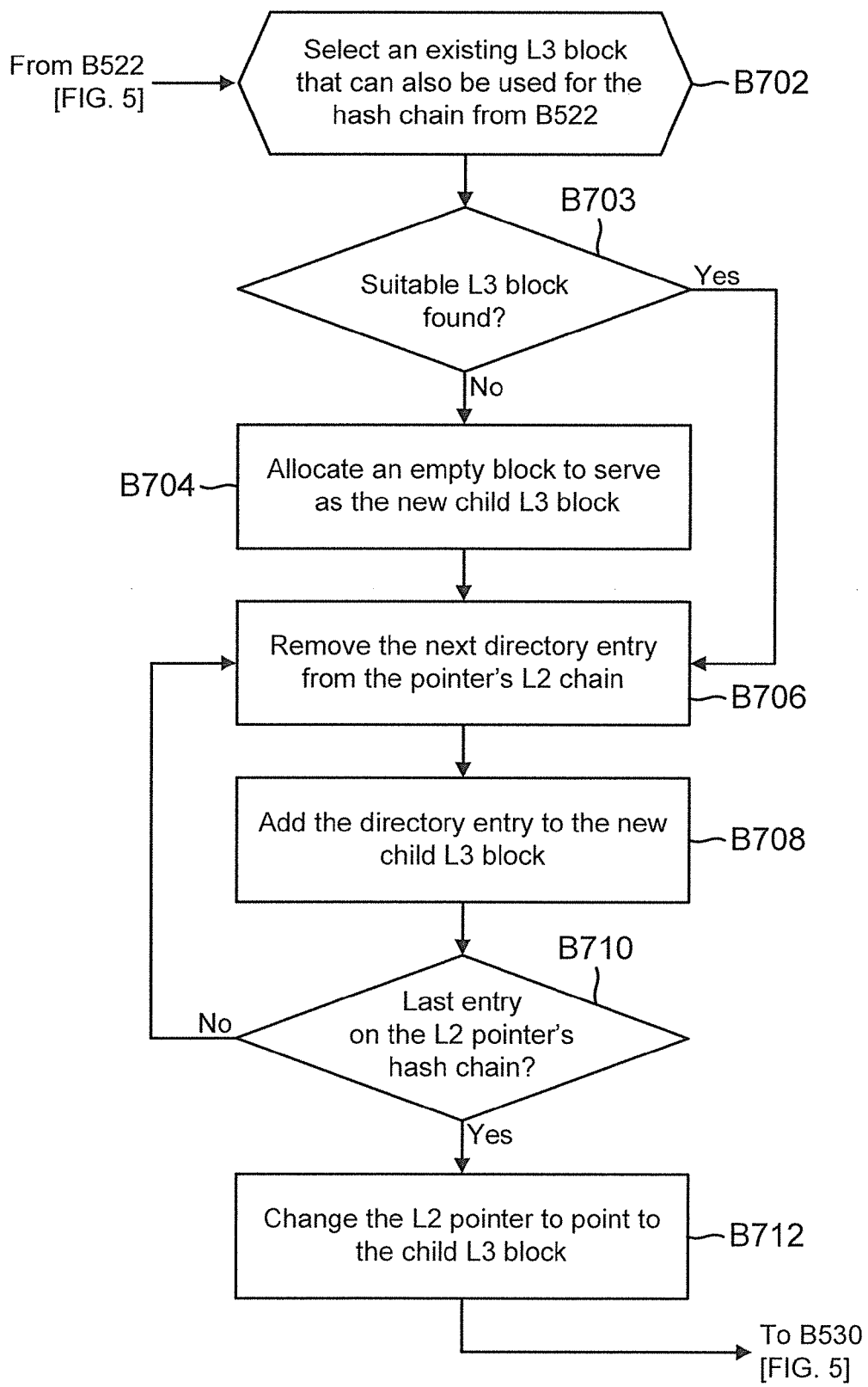

FIG. 7A shows another example for implementing block B528, according to one embodiment. The process of FIG. 7A is intended to use an existing L3 index block efficiently instead of assigning a new L3 index block. The process begins in block B702, when the file system 202 searches for a suitable, existing L3 block that can be re-purposed to store the pointer for H2 (B528, FIG. 5). Details of block B702 are shown in FIG. 7B.

The process determines in block B703, if a suitable L3 index block is found. If yes, then the process moves to block B706, where entries from the L2 index block chain are moved into the existing L3 block, as described above for block B606 (FIG. 6A). Blocks B704, B706, B708, B710 and B712 are similar to blocks B604, B606, B608, B610 and B612 (FIG. 6A), respectively, that have been described above and for sake of brevity are not being described again.

Figure 7B:
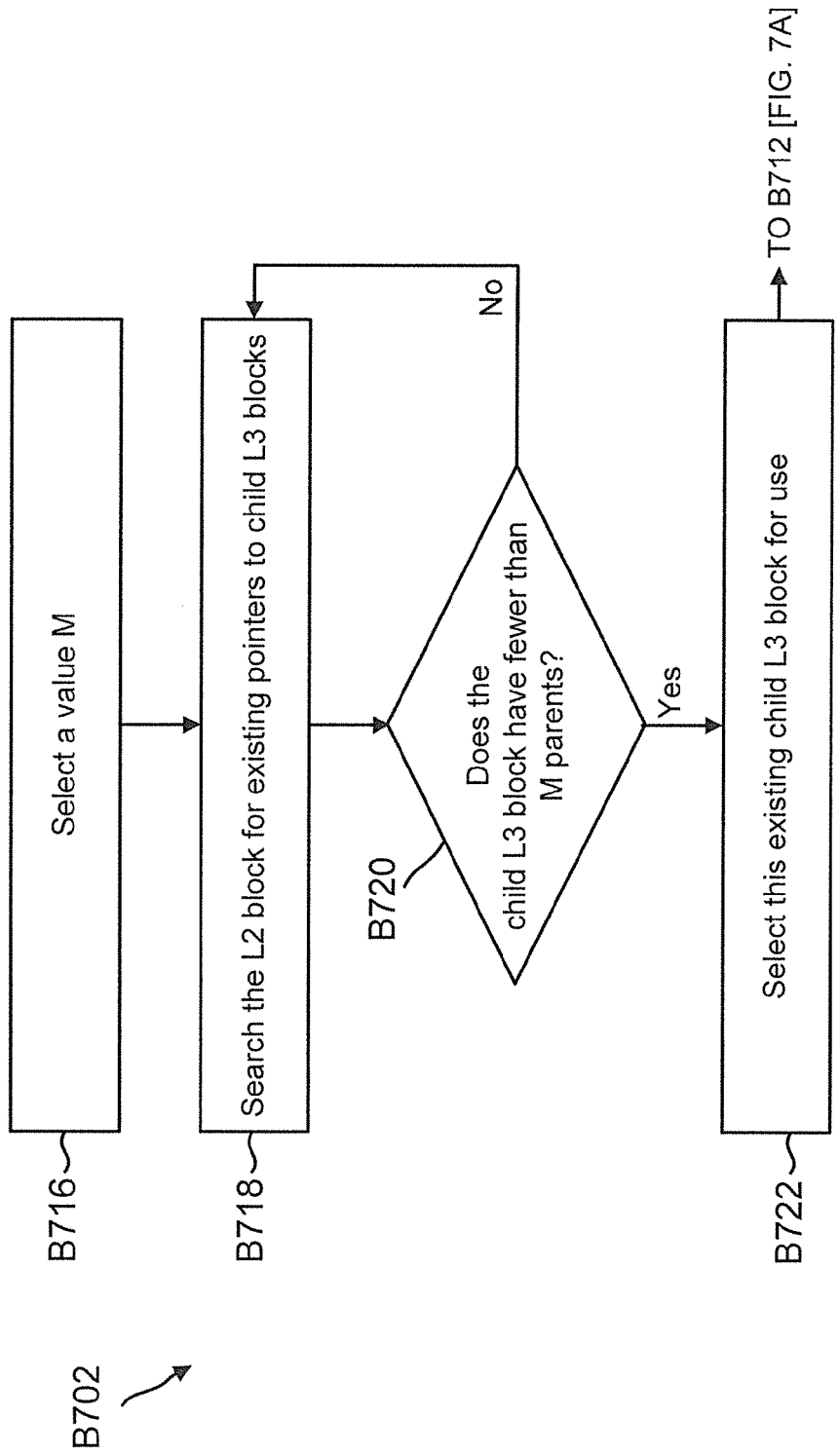

FIG. 7B shows a process flow for executing block B702, according to one embodiment. The process begins in block B716, when a value M is selected. The value M may be between 2 and 128. A smaller value represents better scalability, while a larger value represents better space efficiency.

In block B718, all the pointers that point to L3 blocks are searched. In block B720, the process scans each L3 block to determine if a L3 block has fewer than M parents i.e. fewer than M L2 pointers that point to the L3 block. If no, then the process reverts back to block B718. If yes, then in block B722, the L3 block is selected so that it can be re-purposed and the process moves to block B712 of FIG. 7A.

Figure 8:
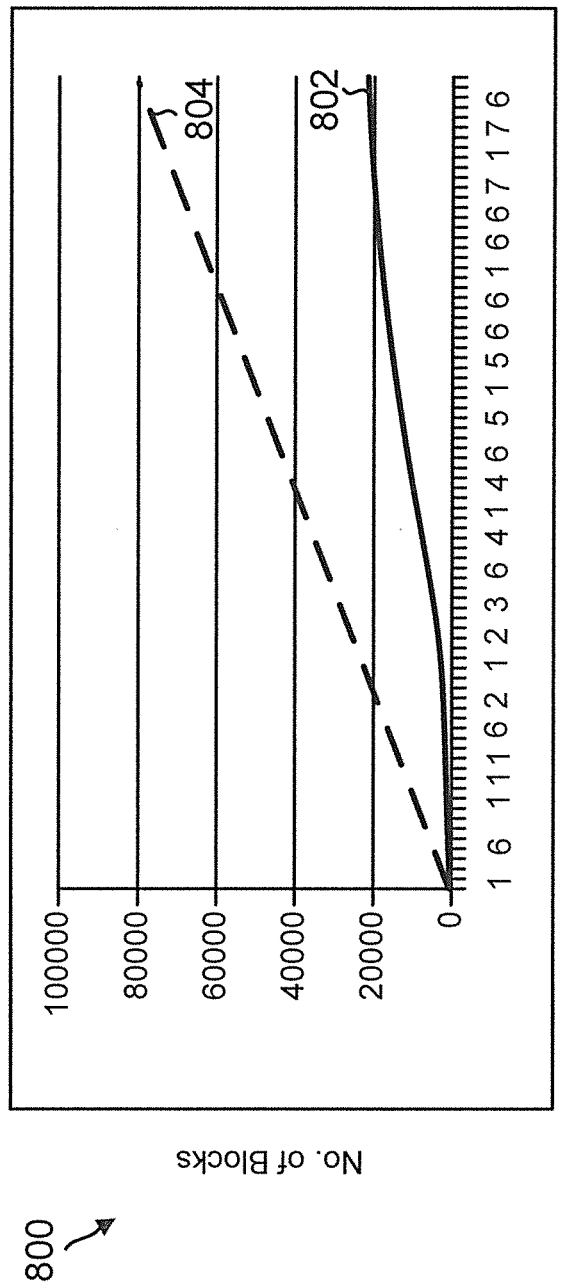
FIG. 8 graphically illustrates the advantages of using the embodiments disclosed herein for storing directory entries.

FIG. 8 shows a graph 800 based on the process flows described above. In graph 800, the number of directory entries exceeds 10 million. Line 804 shows the number of name blocks, while line 802 shows the number of index blocks. As one can see, the number of name blocks exceeds the number of index blocks compared to FIG. 4G. This results in optimal usage of storage space for storing directory entries and the look up index tree for searching the directory entries.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer is a cloud platform and cloud infrastructure followed by a "server" layer that includes hardware and computer software designed for cloud specific services. Details regarding these layers are not germane to the inventive embodiments. The storage systems described above can be a part of the server layer for providing storage services.

Thus, a method and apparatus for allocating index blocks for storing directory entries is provided. Note that references throughout this specification to "one embodiment" or "an embodiment" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
receiving a request to add a new directory entry to an indexed look up tree;
determining hash values for the new directory entry;
identifying a first pointer in a first storage index block based, at least in part, on a first of the hash values, wherein the first pointer references a first chain of directory entries;
determining that the first chain of directory entries has reached a first threshold level for storing directory entries;

selecting the first chain of directory entries and a second chain of directory entries, wherein the second chain of directory entries is referenced by a second pointer in the first storage index block;

identifying a second storage index block based, at least in part, on a count of pointers from one or more storage index blocks that reference the second storage index block, wherein the second storage index block is a pre-existing storage index block;

storing one or more pointers to directory entries of the first chain of directory entries and one or more pointers to directory entries of the second chain of directory entries in the second storage index block; and updating the first pointer and the second pointer to reference the second storage index block.

2. The method of claim 1, further comprising:
prior to storing the one or more pointers, determining whether no existing storage index block is available for storing the one or more pointers to directory entries of the first chain of directory entries; and
in response to determining that no existing storage index block is available for storing the one or more pointers to directory entries of the first chain of directory entries, creating the second storage index block.

3. The method of claim 1, further comprising:
determining whether a third pointer corresponding to a second of the hash values is stored in the second storage index block;
in response to determining that the third pointer is stored in the second storage index block, adding the new directory entry to a third chain of directory entries, wherein the third pointer references the third chain of directory entries; and
in response to determining that the third pointer is not stored in the second storage index block,
storing the third pointer in the second storage index block; and
updating the third pointer to reference the new directory entry.

4. The method of claim 1, wherein identifying the second storage index block comprises:
identifying a plurality of storage index blocks, wherein the plurality of storage index blocks comprises the second storage index block;
selecting a first of the plurality of storage index blocks;
determining whether a count of storage index blocks that reference the first of the plurality of storage index blocks is less than a second threshold;
in response to determining that the count of storage index blocks that reference the first of the plurality of storage index blocks is less than the second threshold, selecting the first of the plurality of storage index blocks; and
in response to determining that the count of storage index blocks that reference the first of the plurality of storage index blocks is not less than the second threshold, selecting a second of the plurality of storage index blocks.

5. The method of claim 1, wherein selecting the first chain of directory entries and the second chain of directory entries comprises:
logically partitioning the first storage index block into a plurality of partitions; and
selecting a partition of the plurality of partitions that comprises the first pointer, wherein the partition of the plurality of partitions further comprises the second pointer.

6. The method of claim 1, further comprising:
determining that a count of pointers selected to be stored in the second storage index block is less than a second threshold; and
in response to determining that the count of pointers selected to be stored in the second storage index block is less than the second threshold, determining that a count of directory entries of the second chain of directory entries is greater than a third threshold;
wherein selecting the second chain of directory entries is in response to determining that the count of directory entries of the second chain of directory entries is greater than the third threshold.

7. A non-transitory, machine readable storage medium having stored thereon instructions comprising machine executable code which, when executed by at least one machine, causes the at least one machine to:
detect a request to add a new directory entry to an indexed look up tree;
determine hash values for the new directory entry;
identify a first pointer in a first level storage index block based, at least in part, on a first of the hash values, wherein the first pointer references a first chain of directory entries;
determine that the first chain of directory entries has reached a first threshold level for storing directory entries;
select the first chain of directory entries and a second chain of directory entries, wherein the second chain of directory entries is referenced by a second pointer in the first level storage index block;
identify a second level storage index block based, at least in part, on a count of pointers from one or more storage index blocks that reference the second level storage index block, wherein the second level storage index block is a pre-existing storage index block;
store one or more pointers to directory entries of the first chain of directory entries and one or more pointers to directory entries of the second chain of directory entries in the second level storage index block; and
update the first pointer and the second pointer to reference the second level storage index block.

8. The storage medium of claim 7, the instructions further comprising machine executable code which, when executed by the at least one machine, causes the at least one machine to:
prior to storage of the one or more pointers, determine whether no existing third level storage index block is available for use; and
in response to a determination that no existing third level storage index block is available for use, create the third level storage index block.

9. The storage medium of claim 7, the instructions further comprising machine executable code which, when executed by the at least one machine, causes the machine to:
determine whether a third pointer corresponding to a second of the hash values is stored in the second level storage index block;
in response to a determination that the third pointer is stored in the second level storage index block, add the new directory entry to a third chain of directory entries, wherein the third pointer references the third chain of directory entries; and
in response to a determination that the third pointer is not stored in the second level storage index block,
store the third pointer in the second level storage index block; and update the third pointer to reference the new directory entry.

10. The storage medium of claim 7, wherein the machine executable code which, when executed by the at least one machine, causes the at least one machine to identify the second level storage index block comprises machine executable code which, when executed by the at least one machine, causes the at least one machine to:
   identify a plurality of second level storage index blocks, wherein the plurality of second level storage index blocks comprises the second level storage index block;
   select a first of the plurality of second level storage index blocks;
   determine whether a count of first level storage index blocks that reference the first of the plurality of second level storage index blocks is less than a second threshold;
   in response to a determination that the count of first level storage index blocks that reference the first of the plurality of second level storage index blocks is less than the second threshold, select the first of the plurality of second level storage index blocks as the second level storage index block; and
   in response to a determination that the count of first level storage index blocks that reference the first of the plurality of second level storage index blocks is not less than the second threshold, select a second of the plurality of second level storage index blocks.

11. The storage medium of claim 7, wherein the machine executable code which, when executed by the at least one machine, causes the at least one machine to select the first chain of directory entries and the second chain of directory entries comprises machine executable code which, when executed by the at least one machine, causes the at least one machine to:
   logically partition the first level storage index block into a plurality of partitions; and
   select a partition of the plurality of partitions that comprises the first pointer, wherein the partition of the plurality of partitions further comprises the second pointer.

12. The storage medium of claim 7, the instructions further comprising machine executable code which, when executed by the at least one machine, causes the machine to:
   determine that a count of pointers selected to be stored in the second level storage index block is less than a second threshold; and
   in response to a determination that the count of pointers selected to be stored in the second level storage index block is less than the second threshold, determine that a count of directory entries of the second chain of directory entries is greater than a third threshold;
   wherein selection of the second chain of directory entries is in response to a determination that the count of directory entries of the second chain of directory entries is greater than the third threshold.

13. A device comprising:
   a processor; and
   a machine readable medium having stored thereon machine executable code which, when executed by the processor, causes the device to,
      detect a request to add a new directory entry to an indexed look up tree;
      determine hash values for the new directory entry;
      identify a first pointer in a first level storage index block based, at least in part, on a first of the hash values, wherein the first pointer references a second level storage index block;
      identify a second pointer in the second level storage index block based, at least in part, on a second of the hash values, wherein the second pointer references a first chain of directory entries;
      determine that the first chain of directory entries has reached a first threshold level for storing directory entries;
      select the first chain of directory entries and a second chain of directory entries, wherein the second chain of directory entries is referenced by a third pointer in the second level storage index block;
      identify a third level storage index block based, at least in part, on a count of pointers from one or more storage index blocks that reference the third level storage index block, wherein the third level storage index block is a pre-existing storage index block;
      store one or more pointers to directory entries of the first chain of directory entries and one or more pointers to directory entries of the second chain of directory entries in the third level storage index block; and
      update the second pointer and the third pointer to reference the third level storage index block.

14. The device of claim 13, the machine readable medium having further stored thereon machine executable code which, when executed by the processor, causes the device to:
   prior to storage of the one or more pointers, determine whether no existing third level storage index block is available for use; and
   in response to a determination that no existing third level storage index block is available for use, create the third level storage index block.

15. The device of claim 13, the machine readable medium having further stored thereon machine executable code which, when executed by the processor, causes the device to:
   determine whether a fourth pointer corresponding to a third of the hash values is stored in the third level storage index block;
   in response to a determination that the fourth pointer is stored in the third level storage index block, add the new directory entry to a third chain of directory entries, wherein the fourth pointer references the third chain of directory entries; and
   in response to a determination that the fourth pointer is not stored in the third level storage index block,
      store the fourth pointer in the third level storage index block; and
      update the fourth pointer to reference the new directory entry.

16. The device of claim 13, wherein the machine executable code which, when executed by the processor, causes the device to select the first chain of directory entries and the second chain of directory entries comprises machine executable code which, when executed by the processor, causes the device to:
   logically partition the second level storage index block into a plurality of partitions; and
   select a partition of the plurality of partitions that comprises the second pointer, wherein the partition of the plurality of partitions further comprises the third pointer.

17. The device of claim 13, the machine readable medium having further stored thereon machine executable code which, when executed by the processor, causes the device to:
   determine that a count of pointers selected to be stored in the third level storage index block is less than a second threshold; and
   in response to a determination that the count of pointers selected to be stored in the third level storage index block is less than the second threshold, determine that a count of directory entries of the second chain of directory entries is greater than a third threshold;

wherein selection of the second chain of directory entries is in response to a determination that the count of directory entries of the second chain of directory entries is greater than the third threshold.

* * * * *